March 11, 1969     C. V. FOGELBERG     3,431,599
EXTRUSION METHOD AND APPARATUS
Filed Dec. 4, 1964
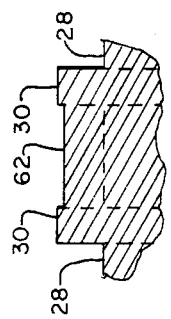
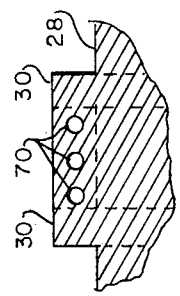
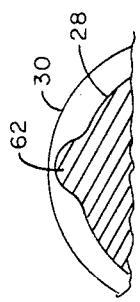
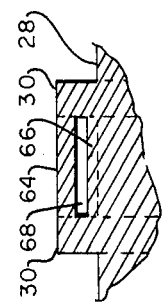
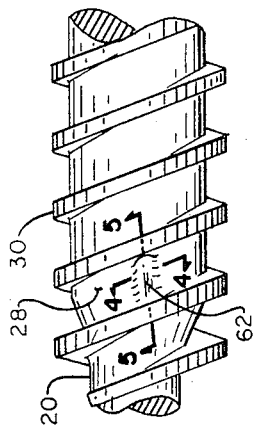
INVENTOR.
CLEMENT V. FOGELBERG
BY
ATTORNEY United States Patent Office 3,431,599
Patented Mar. 11, 1969

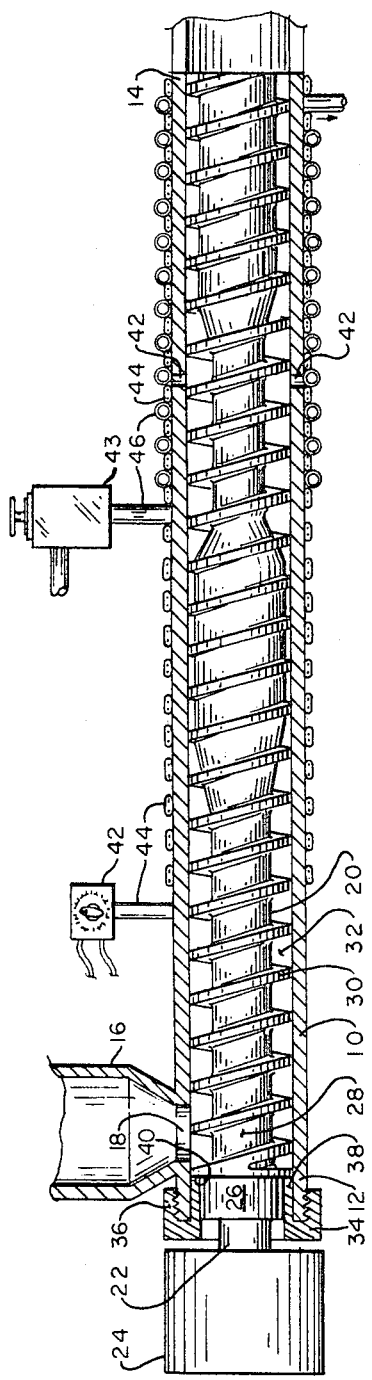
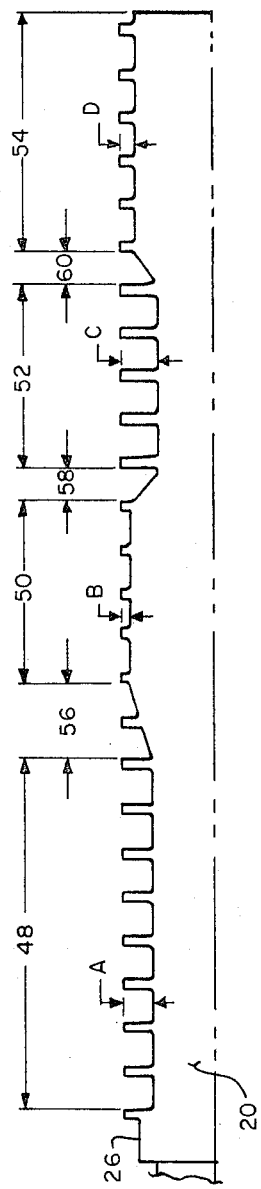

3,431,599
EXTRUSION METHOD AND APPARATUS
Clement V. Fogelberg, Boulder, Colo., assignor to Ball Brothers Research Corporation, Boulder, Colo., a corporation of Colorado
Filed Dec. 4, 1964, Ser. No. 415,999
U.S. Cl. 18—12                    3 Claims
Int. Cl. B29f 3/08

This invention relates to the extrusion of thermoplastic materials and more particularly to improvements in extruders and their method of operation.

Thermoplastic materials are generally melted and mixed in a continuous process within a rotating screw type extruder. Thermoplastic material is normally added to the extruder in the form of dry particles such as pellets or shavings. Through the action of a screw in the extruder barrel, such particles are so worked and pressed together that they become heated, softened, and mixed together. After leaving the extruder, the material will flow under pressure in a highly viscous state and is amenable to ordinary forming processes; for example, blow molding. To properly prepare thermoplastic material for such forming processes, it is important that the softened or melted pellets be mixed sufficiently with one another to form a homogeneous thermoplastic mass having uniform properties.

One of the problems with extrusion apparatus presently employed is the limited output of properly prepared material possible in terms of pounds per hour for an extruder of a given size. The extruders employed at present generally have sufficient output fo feed material to forming machines employed in the past. However, it will be apparent that with present day operations employing newly developed forming machines capable of utilizing much more than the maximum extruder output presently available from an extruder and where a very high production rate is extremely important in order to reduce the cost of formed articles to a competitive level, this limited output of presently available extrusion equipment is a significant disadvantage. Many manufacturers have attempted to increase the output of their extrusion equipment in order to increase production. This increase in output has been effected in several different ways; for example, the speed of rotation of the extruder screw has been increased or the cross-sectional area of the passage through the extruder has been increased.

One of the problems resulting from such efforts has been the amount of heat generated during the melting and mixing process. Thus, the material becomes molten very rapidly and reaches such a high temperature that the material cannot be sufficiently cooled within the extruder for use in normally employed forming processes. For example, tubing issuing from an extruder at too high of a temperature tends to sag or neck-down, forming a parison which is too long and which has an improper material distribution for a blow mold of a given size. In addition, parisons formed from such tubing are often too sticky for handling by normal processing equipment and therefore are unuseable in a blow molding process, especially where the parison is transfered from the extruder to mold by independent transfer means. Moreover, articles formed from parisons which have a high temperature must be held in the mold for a longer period of time and until sufficient heat is removed to allow the article to retain its shape when released. Efforts expended to develop more efficient cooling systems for use with extrusion equipment have reached the point where only insignificant gains can be made at tremendous expense to lower the temperature of the thermoplastic material.

In a few instances, manufacturers are able to tolerate thermoplastic material having a very high temperature, due to the nature of the particular forming process employed. However, when an extruder of a given size is employed to produce an increased amount of thermoplastic material at this high temperature, other serious problems have been encountered. For example, large variations in the back pressure at certain sections of the extrusion apparatus have been apparent resulting in troublesome fluctuations in the amount of material extruded. This causes considerable problems in a continuous operation wherein it is desired that a fixed amount of thermoplastic material be regularly and continuously supplied in a given shape at a given point for use in a forming process or for transferring to other forming equipment.

In a typical arrangement, the capacity from a three and one-half inch extruder previously employed by manufacturers to extrude polyethylene material in the shape of a parison for expansion into a bottle by blow molding has been only about 300 pounds per hour, depending upon several factors but primarily the maximum stock temperature which can be tolerated for a specific forming process. The extruder screw employed therein typically has a feeding section with a flight depth of .455 inch and a length of 37.5 percent of the length of the screw, a first metering section with a flight depth of .130 inch and a length of 12.5 percent of the length of the screw, a venting section with a flight depth of .375 inch and a length of 16.6 percent of the length of the screw, and a second metering section with a flight depth of .215 inch and a length of 16.6 percent of the length of the screw, the balance of the length being in transition zones. When producing polyethylene material at 300 pounds per hour, the stock temperature normally can be held at 435° F. The extruder requires 60 horsepower to drive the extruder screw at 100 revolutions per minute. Furthermore, the back pressure within the extruder will be up to 6000 pounds per square inch at the extruder breaker plate primarily to minimize surging. When the extremely high cost of this extrusion apparatus is considered, the impact of this limitation in output can be fully appreciated.

In view of the above difficulties and limitations of extrusion apparatus presently employed, it is an object of the present invention to provide a new and improved extrusion method and apparatus by which the production of thermoplastic material in a workable condition and at a suitable temperature for forming processes can be obtained.

A further object of this invention is the provision of an extrusion method and apparatus which increases the output of thermoplastic material from an extruder of a given size.

A further object of this invention is to provide extrusion apparatus which can operate at a greatly reduced back-pressure and which requires less horsepower to drive a screw per unit weight of material processed while achieving the same or greatly increased output of material.

A still further object of the invention is to provide an extrusion method and apparatus for producing adequately melted and mixed thermoplastic material at the same or increased output rate without the presence of large variations of back-pressure within the extruder, referred to as "surging."

The invention itself, as well as further details thereof and additional objects and advantages thereof, will be readily understood when read with the accompanying drawings, in which:

FIGURE 1 is a sectional side elevation of extrusion apparatus of the present invention;

FIGURE 2 is a diagrammatic description of an extruder screw of the present invention showing various functional sections;

FIGURE 3 is a side view of a portion of the extruder screw employed in the apparatus shown in FIGURE 1 and which illustrates a dam of the present invention;

FIGURE 4 is a sectional view of the dam shown in FIGURE 3, taken along lines 4—4; and FIGURES 5A, 5B, and 5C are sectional views of various forms of the dam shown in FIGURE 3 taken along lines 5—5.

The novel extrusion apparatus of the present invention employs an extruder screw rotatably mounted within a conventional type of extruder barrel. The extruder screw of the invention has a generally smaller root diameter and a greater flight depth over its entire length. More specifically, the channel formed by the helical flights of the screw thread on the core or root of the screw is generally of a larger cross-sectional area than the corresponding channel on similar extruder screws of equivalent size employed in the past, thereby providing functional zones or sections along the length of the screw which have a larger volume. In addition, the screw of the invention has a different number of flights, or a different percentage of its length, allocated to particular functional zones than do screws employed in the past. This results in optimization of certain times for certain functions; specifically, the time or length of channel delegated to a feeding function is decreased and the time or length of channel in which the mixing and melting function occurs is increased.

An important facet of the invention is the size or shape of the channel of the extruder screw relative to an extruder of a given size. Thus, as is pointed out below, there is a critical relationship between the flight depth of various functional sections along the extruder screw and the length of each functional section relative to the length of the screw. Most preferable results have been obtained when they are held within certain specified ranges hereinafter set forth.

Furthermore, it is believed that in an extruder screw having at least a feeding section and a second section having a flight depth less than the flight depth of the feeding section, various portions of such an extruder operate as positive displacement pumps. The position of these portions in a given extruder depends upon many factors such as where melting and mixing occurs and the rate of operation of a given screw. If these pumps are not balanced in some way or another, interaction between the various pumping sections causes fluctuations in back-pressure or surging. It has been discovered that surging or variations in back-pressure within such extrusion apparatus can be substantially avoided by inserting a constriction within one or more of the sections of the extruder screw which is already one of the most constricted sections of the extruder screw and has a flight depth less than that of the feeding section. It has been found that such a constriction can be provided by inserting a dam or partial obstruction which may be a rib of a given configuration within the channel between two adjacent flights, situated within an already more restricted functional section of the extruder screw. Such a constriction serves to prevent or substantially eliminate any backflow and surging from one pumping section to the other. One result of this constriction is to provide a constant flow of material at the exit end of the extruder per unit of time while substantially eliminating surging within the extruder.

A greater appreciation of the limitations of previous extrusion equipment and of the advancements made by applicant's invention may be gained from an analysis of the following figures. Extrusion apparatus of the present invention typically employs a screw having a feeding section with a flight depth of .470 inch and a length of 29 percent of the length of the screw, a first metering section with a flight depth of .145 inch and a length of 21 percent of the length of the screw, a venting section with a flight depth of .515 inch and a length of 16.6 percent of the length of the screw, and a second metering section with a flight depth of .231 inch and a length of 16.6 percent of the length of the screw, the balance of the length being in transition zones.

By employing such a novel screw of the present invention in a three and one-half inch extruder of the type normally employed, vastly improved results are obtained. In excess of 400 pounds per hour of useable material at a temperature of 400° F. are consistently produced by such an extruder. Furthermore, only 59 horsepower are required to drive the extruder screw at 100 revolutions per minute. In addition, a back-pressure of only about 4200 p.s.i. was measured at the extruder breaker plate.

Thus, it can be seen that with the same general equipment setup but employing an extruder screw of the present invention, a manufacturer may achieve a greatly increased output; that is, an output of at least up to 33 percent greater than his original output.

In addition, by employing a larger motor to drive a three and one-half inch extruder incorporating an extruder screw of the invention, an output of over 500 pounds per hour of extrudate can be obtained; that is, an increase of over 50 percent of its normal output. Thus, by employing 89 horsepower to drive the screw, over 500 pounds per hour of extrudate were obtained having a temperature of approximately 410° F. and with a back-pressure at the extruder breaker plate of only 4700 pounds per square inch.

Furthermore, it should be realized that although the above figures have been presented for a three and one-half inch extruder, it will be apparent from the description of the invention that relative advantages may be obtained on other types and sizes of extrusion apparatus, modified in accordance with the invention.

It should also be noted that, previous to the invention, it would only be possible for manufacturers to obtain an output equivalent to the increased output by purchasing a much larger extruder, for example, a four and one-half inch extruder, in order to obtain an output of between 450 and 500 pounds per hour. It is recognized that this output could be approached by a three and one-half inch extruder operated at a higher output rate as mentioned above. However, in this instance, manufacturers would have to tolerate the high temperatures and fluctuations in back-pressure or surging, which render the material in most instances unuseable. The purchase of such a larger extruder involves a very great expense, the cost of a four and one-half inch extruder being in the neighborhood of 200 percent of the cost of a three and one-half inch extruder. The modifications to a three and one-half inch extruder in order to operate it in accordance with the invention would amount to only approximately 50 percent of the cost of the three and one-half inch extruder. Thus, it can be seen that a considerable saving can be afforded a manufacturer while providing him with a greatly increased output.

Referring now to the drawings, FIGURE 1 shows a cylindrical bore 10 having two open ends 12 and 14 and a feed hopper 16 mounted radially on the sidewall of bore 10 adjacent to open end 12. The interior of feed hopper 16 communicates with the interior of cylindrical bore 10 by means of opening 18 in the sidewall of cylindrical bore 10. A screw 20 is rotatably mounted within cylindrical bore 10 and extends from open end 12 to open end 14, serving as a helical screw conveying device. Screw 20 has a shaft portion 22 extending outwardly through open end 12 and operably connected to motor 24, which serves to rotatably drive screw 20 within cylindrical bore 10. Suitable speed reduction and transmission means (not shown) may be utilized between motor 24 and shaft portion 22 in order to control the speed of screw 22.

Screw 20 has progressively along its length from shaft portion 22, a sealing portion 26 and a recessed root or core 28 around which is mounted a helical land portion or rib 30 serving as a screw thread and forming a screw of relatively constant pitch which extends from sealing portion 26 along cylindrical bore 10 to open end 14. Helical land portion 30 forms a helix having an outside diameter substantially equal to the inside diameter of cylindrical bore 10, allowing for a slight clearance between the inside surface of bore 10 and the outside surface of helical land portion 30. Thus helical land portion 30 on core 28 forms a helical channel 32 along cylindrical bore 10. The diameter of core 28 along the length of screw 20 varies in proportion with the cross-sectional area of channel 32.

Screw 20 is retained within cylindrical bore 10 by a thrust bearing 34 having an outer flange portion 36, the inside surface of which is threadedly engaged with the outside surface of open end 12 of cylindircal bore 10. Thrust bearing 34 has a flange 38 depending inwardly into open end 12 of cylindrical bore 10, the end of which flange bears against a surface 40 radially depending inwardly from sealing portion 26 on screw 20. The inside surface of flange 38 of thrust bearing 34 bears against the outside surface of sealing portion 26. In this manner, movement of screw 20 in the direction of open end 12 of bore 10, due to back-pressure or forces generated during rotation of screw 20, is prevented. Shaft portion 22 extends through thrust bearing 34 and is operably connected to motor 24. Vent holes 42 may be provided in bore 10 when material is being extruded which forms volatile products due to the creation of heat, such as polyvinylchloride.

A heating coil 44 is helically wound around the outside surface of cylindrical bore 10 and over approximately three-quarters of its length from open end 14. Cooling coils 46 are likewise helically wound around the outside surface of cylindrical bore 10 over approximately one-half of its length extending from open end 14 and are alternately disposed between heating coils 44. Heating coils 44 are preferably of a type known as "strip heaters" and application of varying amounts of heat can be controlled by a type of rheostat 42 which serves to control the current fed to strip heaters 44. The heating coils 44 are primarily used when a cold extruder is initially started up, and the coils 44 are normally turned off during operation, sufficient heat being generated by the pressure and friction of the material. Cooling coils 46 are preferably water tubes through which cooling fluid can be passed, the rate of cooling being controlled by adjusting a valve 43. If desired, a plurality of sets of cooling coils 46 may be employed in the manner shown, one for each functional section to help control the temperature of the material therein.

FIGURE 2 more clearly illustrates certain features of a screw 20 of the invention. The portion of screw 20 extending from sealing portion 26 toward open end 14 has approximately 24 flights and is basically divided into a plurality of functional zones or sections, each connected to succeeding sections by a short transitional section. Although the outside flight diameter of helical and portion 30 is substantially constant over the length of the screw, the diameter of the root or core 28 varies in a preferred manner, which will be presented later, in order to control the action of the mixing and melting of thermoplastic material and prepare a homogeneous product in the most desirable condition.

The screw 20 is divided into four zones or sections including a first section 48 located adjacent to sealing portion 26, known as a feeding section, receiving material from feed hopper 16 and mixing, softening and melting the material therein. Feed section 48 has a flight depth represented by reference letter A determined in part by the size of the particular material, as well as the size of the particular extruder being employed. Section 50 is referred to as a first metering section and has a flight depth represented by reference letter B, less than flight depth A. Section 52 is referred to as a venting section and has a flight depth represented by reference letter C, greater than flight depth B. Section 54 is referred to as a second metering section and has a flight depth represented by reference letter D, less than flight depth A. Section 48 and section 50 are connected by a first transitional section 56 having a gradually increasing root or core diameter. Section 50 and section 52 are connected by a second transitional section 58 having a gradually decreasing root or core diameter. Section 52 and section 54 are connected by a third transitional section 60 having a gradually increasing root or core diameter.

An extruder screw of the invention advantageously has a feeding section 48 having a length of between about 33 percent and 36 percent of the length of said screw, a first metering section 50 having a length of between about 15 percent and 19 percent of the length of said screw, a venting section 52 having a length of between about 15 percent and 19 percent of the length of said screw, and a second metering section 54 having a length of between about 15 percent and 19 percent of the length of said screw, the balance of said screw being allocated to transitional sections. The feeding section 48 and the first metering section 50 are preferably connected to a transitional section 56 having a length of between about 7 percent and 7.5 percent of the length of said screw.

In addition, each section of the screw preferably has a substantially constant root diameter and a substantially constant flight diameter along its length and is connected to adjacent sections by transitional sections of substantially constantly varying root diameter and flight depth. Thus, the feeding section 48 should have a flight depth A of between about 12 percent and 15 percent of its outside flight diameter, the first metering section 50 should have a flight depth B of between about 3 percent and 5 percent of its outside flight diameter, the venting section 52 should have a flight depth C of between about 13 percent and 16 percent of its outside flight diameter, and the second metering section 54 should have a flight depth D of between about 5 percent and 8 percent of its outside flight diameter. Expressed in slightly different terms, the feeding section 48 of the screw should have a root diameter equal to between about 70 percent and 75 percent of its outside flight diameter, a first metering section 50 should have a root diameter equal to between about 90 percent and 94 percent of its outside flight diameter, the venting section 52 should have a root diameter equal to between about 68 percent and 72 percent of its outside flight diameter, and the second metering section 54 should have a root diameter equal to between about 85 percent and 88 percent of its outside flight diameter.

Excellent results have been obtained with a screw having a feeding section with a flight depth of about 13.4 percent of its outside flight diameter, a first metering section with a flight depth of about 4 percent of its outside flight diameter, a venting section with a flight depth of about 14.7 percent of its outside flight diameter, and a second metering section with a flight depth of about 6.6 percent of its outside flight diameter. Expressed in other terms, this screw has a feeding section with a root diameter equal to about 73 percent of its outside flight diameter, a first metering section with a root diameter equal to about 92 percent of its outside flight diameter, a venting section with a root diameter equal to about 70.6 percent of its outside flight diameter, and a second metering section with a root diameter equal to about 96.9 percent of its outside flight diameter.

Although the extrusion apparatus described above, utilizing an extruder screw of the invention, may be employed to melt and mix many different types of thermoplastic materials having differing melting characteristics and temperatures, excellent results have been obtained in the extrusion of polyethylene material of what is referred to as a "bleach grade." The advantages of the invention, such as increased output for extrusion apparatus of the given size and reduced back-pressure and lower temperatures within the extruder, may likewise be achieved with other thermoplastic materials.

In melting polyethylene material by means of the above apparatus in accordance with the method of the invention, it has been found that the temperature of the barrel within the feeding section 48 should be between about 500 and 540° F., as it is being advanced through a helical channel 32 having a given cross-sectional area. The temperature of the barrel within the first metering section 50 should be between about 445 and 485° F., while it is advanced through a channel having a cross-sectional area between about 25 percent and 35 percent of the given cross-sectional area. The temperature of the barrel within the venting section 52 should be between about 235 and 275° F., while it is further advanced through a channel having a cross-sectional area of between about 105 percent and 115 percent of the given cross-sectional area. The temperature of the barrel within the second metering section 54 should be between about 250 and 290° F., while it is advanced through a channel having a cross-sectional area of between about 45 percent and 55 percent of the given cross-sectional area.

Although the theory of extrusion is not well understood, as mentioned above, it has been discovered that an extruder screw operates like a positive displacement pump. It has also been theorized that primarily one or more portions of the screw act as pumping sections. Often, one sections tends to pump a larger volume of material than the other, due to a great many factors such as the temperature of the material along the extruder. When these sections are not in balance, the sections counteract each other and produce an effect known as "surging," which is a troublesome fluctuation in back-pressure and which results in a fluctuation in the amount of material issuing from the extruder.

It has been discovered that by sharply constricting the material within the screw channel along the portion of the extruder screw where the material is already relatively more restricted than at the feed section, for instance, such surging is substantially eliminated. Thus, in a screw having a feeding section and a second section of relatively smaller flight depth, it is important that such a constriction be placed within the second section.

In an extruder screw of the type illustrated in FIGURE 2, it is believed that the first metering section 50 and second metering section 54 both act as pumping sections as well as serving to mix and melt thermoplastic material. This seems to be true since the material within those sections is compacted substantially solidly within the channel of the screw and must progress toward the exit end 14 of bore 10 as the screw rotates, when the pressure from the colder and less fluid material toward feed end 12 of bore 10 supplies sufficient resistance to back-flow. However, it has been further discovered that due to the large number of variables encountered within the extruder screw, it is difficult if not impossible to balance the capacity or pumping rate of each of the pumping sections 50 and 54. Therefore, these pumping sections tend to counteract each other, first in volume and then in pressure effects, resulting in surging or large variations in back-pressure within various portions of the extruder. These variations in back-pressure or surging have been substantially eliminated by the insertion of a constriction within the groove passing through either one of the pumping sections.

FIGURE 3 is a side view of a portion of an extruder screw and illustrates a constriction positioned within the groove of the screw in the section in which the material is already most constricted. Such a constriction may typically be in the form of an obstruction or dam 62 which comprises a solid portion or rib of material which extends substantially normal to the sidewalls of adjacent screw threads or flights as shown. The height of the dam or rib 62 is slightly less than the height of each screw thread or flight and the width is preferably less than its length. FIGURE 4 shows a cross-sectional view of the rib or dam 62, taken along line 4—4 of FIGURE 3. As shown in FIGURE 4, the rib or dam may be rounded at the top and may conveniently flare outwardly and smoothly meet with the root or core 28 of the extruder screw 20.

FIGURES 5A, 5B and 5C are sectional views taken along line 5—5 of FIGURE 3 and illustrate a few of the many different forms which dam 62 may take. These different forms are shown merely by way of example and are not intended to restrict the invention to one of the specific forms shown. FIGURE 5A shows a solid dam 62 of a height slightly less than the height of the helical rib 30 forming the screw threads or screw flights. FIGURE 5B shows a dam 62 composed of a top portion 64 and a bottom portion 66, which portions 64 and 66 extend laterally between two adjacent screw threads or flights as shown in FIGURE 5B leaving a space 68 therebetween. FIGURE 5C illustrates a dam 62 which occupies substantially the entire cross-sectional area of the screw channel 32 and which has a plurality of holes 70 therethrough.

It appears that the insertion of a constriction within one or more of the already more constricted sections of a screw, such as the first metering section 50 or the second metering section 54 of the screw shown in FIGURE 2, separates each of the pumping sections 50 and 54, respectively, from each other. This functionally separates the pressure differences between portions of a screw such as the two pumping sections, resulting in a smoothing out of the pressure and volume of material issuing from the extruder over a given period of time. Indeed, it has been discovered that in some instances more than one dam 62 may be employed to even greater advantage depending upon the type of material being extruded and other factors. In this instance, one or more dams 62 may be placed in each one of pumping sections 50 and 54. When only one dam is employed, it should preferably be within the second metering section and, even more advantageously, at the beginning of such section.

It has been found that a dam 62 employed as shown in FIGURE 3 should have a height less than the height of each flight or screw thread but greater than 50 percent of the flight depth of a particular section in which it is positioned so as to sharply restrict the channel within that section and constrict the material passing therethrough. Thus, excellent results have been obtained with a dam having a height of 85 percent of the flight depth and located within the first flight of the second metering section of the above screw.

Specific tests were run with an extruder screw employed in apparatus similar to that shown in FIGURE 1 having twenty-four flights and an outside flight diameter of about 3.5 inches. This screw had a feeding section with a flight depth of about .47 inch, a first metering section with a flight depth of about .143 inch, a venting section with a flight depth of about .515 inch, and a second metering section with a flight depth of about .231 inch. The feeding section had a length of about 8¼ flights, the first metering section had a length of about 4 flights, the venting section had a length of about 4 flights, and the second metering section had a length of about 4 flights. In this case, the feeding section and the first metering section were connected by a transitional section having a length of about 1¾ flights, the first metering section was connected to the venting section by the transitional section having a length of about ¾ flights, and the second metering section was connected to the venting section by a transitional section having a length of about 1 flight. Furthermore, a dam was employed within the first flight of the second metering section 54 of the type shown in FIGURE 5A and with 0.050-inch clearance between the top of the dam and the outside surface of the rib 30.

In such an extruder having a screw and bore with a mean diameter of 3.5 inches, the following vastly improved results were obtained. In operation over a fairly continuous period of time, the above extruding apparatus produced in excess of 500 pounds per hour of polyethylene material, operating at a rate of 535 pounds per hour. During this production run, fluctuations in back-pressure within the extruder were substantialy eliminated with the result that substantially constant temperatures were obtained within each of the functional zones of the screw, as well as a substantially constant flow of material issuing from the extruder. Moreover, the material or extrudate produced during the production run was of a homogeneous consistency and stock temperatures were maintained at 410° F. The above output rate was obtained while employing 89 horsepower to drive the screw at a speed of 100 revolutions per minute. The back-pressure measured at the extruder breaker plate remained constant at about 4700 pounds per square inch.

In view of the above description of the invention and of the drawings, it can be seen that the invention provides a novel type of screw apparatus and more particularly a new and improved extruder screw for use in extruding thermoplastic material such as polyethylene. Furthermore, it is apparent from the above invention that the extruder screw overcomes some of the serious problems of prior extruder screws; that is, less heat is generated by the action of this screw and less back-pressure is created during extrusion. Furthermore, the greatly increased output from the extrusion apparatus of the invention can be obtained in a homogeneous and useable condition. Moreover, it has been shown that by employing a dam or obstruction as described in the invention, extrusion apparatus of the invention can substantially eliminate both fluctuations in back-pressure and the resulting fluctuations in temperature which have been undesirable in the past.

From the above description of the invention, it will be apparent that various modifications in the apparatus described in detail herein may be made within the scope of the invention. Furthermore, although examples have been presented illustrating the relative advantages of the apparatus and method of the invention when employed with polyethylene material, it will be apparent that the same principles of the invention may be employed advantageously with other types of thermoplastic materials such as polyvinylchloride, polypropylene, etc. Therefore, the invention is not to be limited to the specific details of the apparatus described herein except as may be required by the following claims.

What is claimed is:

1. An extruder screw having a plurality of functional sections along its length, including a feeding section having a length of between about 33% and 36% of the length of said screw and a flight depth of between about 12% and 15% of its outside flight diameter, a first metering section having a length of between about 15% and 19% of the length of said screw and a flight depth of between about 3% and 5% of its outside flight diameter, a venting section having a length of between about 15% and 19% of the length of said screw and a flight depth of between about 13% and 16% of its outside flight diameter, and a second metering section having a length of between about 15% and 19% of the length of said screw and a flight depth of between about 5% and 8% of its outside flight diameter said screw having at least one partial obstruction located in at least one of the more constricted sections of the screw.

2. An extruder screw comprising an elongated cylindrical core, a helical land portion which defines a helical groove along the length of said core, said screw having a plurality of flights and a plurality of functional sections, said sections comprising a feeding section having a flight depth between 12% and 15% of the outside flight diameter and a length of between about 33% and 36% of the length of said screw, a first metering section having a first metering flight depth between 3% and 5% of the outside flight diameter and a length of between about 15% and 19% of the length of said screw, a venting section having a venting flight depth between 13% and 16% of the outside flight diameter and a length of between about 15% and 19% of the length of said screw, a second metering section having a second metering flight depth between 5% and 8% of the outside flight diameter and a length of between about 15% and 19% of the length of said screw, and a second land portion disposed within said groove between adjacent flights in one of said metering sections, said dam being substantially perpendicular to said flights and blocking a major portion of the cross-sectional area of said groove, thereby forming a partial obstruction against the flow of material along said groove.

3. Extrusion apparatus comprising an elongated cylindrical barrel having a feed end and an exit end, a helical screw conveying device rotatably mounted in said barrel, means for rotatably driving said screw conveying device, heating means surrounding portions of said cylindrical barrel, control means regulating the action of said heating means, cooling means surrounding portions of said cylindrical barrel and interspersed between said heating means located thereon, control means regulating the action of said cooling means, and feeding means located at said feed end, said screw conveying device comprising an elongated cylindrical core, a helical land portion which forms a plurality of flights and a helical groove along the length of said core, said screw conveying device having a plurality of flights and a plurality of functional sections, said sections comprising a feeding section having a flight depth between 12% and 15% of the outside flight diameter and a length of between about 33% and 36% of the length of said screw, a first metering section having a first metering flight depth between 3% and 5% of the outside flight diameter and a length of between about 15% and 19% of the length of said screw, a venting section having a venting flight depth between 13% and 16% of the outside flight diameter and a length of between about 15% and 19% of the length of said screw, a second metering section having a second metering flight depth between 5% and 8% of the outside flight diameter and a length of between about 15% and 19% of the length of said screw, the balance of said flights being allocated to transitional sections, and a second land portion disposed within said groove between adjacent flights in said second section, said land portion being substantially perpendicular to said flights and blocking at least 75% of the cross-sectional area of said groove, thereby forming a partial obstruction against the flow of material along said groove.

References Cited

UNITED STATES PATENTS

| | | | |
|---|---|---|---|
| 3,123,860 | 3/1964 | Vesilind | 18—12 |
| 3,239,883 | 3/1966 | Ferrari | 18—12 |
| 3,263,276 | 8/1966 | Maier | 18—12 |

JOSEPH L. SCHOFER, *Primary Examiner.*

L. EDELMAN, *Assistant Examiner.*

U.S. Cl. X.R.

260—92.8, 93.7, 94.9